United States Patent [19]

Bryden

[11] 4,067,007
[45] Jan. 3, 1978

[54] ADAPTIVE COMPASS DRIVE SYSTEM

[75] Inventor: Joseph E. Bryden, Framingham, Mass.

[73] Assignee: Raytheon Company, Lexington, Mass.

[21] Appl. No.: 647,275

[22] Filed: Jan. 5, 1976

[51] Int. Cl.² .............................................. H03K 13/02
[52] U.S. Cl. ............................ 340/347 SY; 33/363 R; 318/654
[58] Field of Search ................. 340/347 SY, 347 AD; 33/317 R, 319, 363 R; 318/138, 184, 372, 654, 603, 696

[56] References Cited

U.S. PATENT DOCUMENTS

| 3,914,759 | 10/1975 | Herchenroeder | 340/347 SY |
| 3,921,305 | 11/1975 | King et al. | 33/363 R |
| 3,970,942 | 7/1976 | Mayer | 318/184 X |

*Primary Examiner*—Thomas J. Sloyan
*Attorney, Agent, or Firm*—Herbert W. Arnold; Milton D. Bartlett; Joseph D. Pannone

[57] ABSTRACT

A radar system having an adaptive compass drive capable of operation over a wide variety of compass outputs and supply voltages and frequencies. For compass outputs in the form of multi-phased analog signals, a digital phase detector converts the signals to a series of digital pulses which are used to operate a three-phase to UP-DOWN pulse converter. If the gyro compass output signals are in the form of overlapping digital signals, the converter changes the signals directly to a sequence of UP or DOWN pulses. The UP-DOWN pulses are used to operate a binary counter which operates the phases of a multi-phased stepper motor which is coupled to the true bearing scale of the radar system the output of which may also be used to operate a north stabilization synchro converter for the radar display.

13 Claims, 12 Drawing Figures

ADAPTIVE COMPASS DRIVE SYSTEM

BACKGROUND OF THE INVENTION

1. Field of the Invention.

The invention relates to a radar system adapted for shipboard operation in which a gyro compass produces signals which are used to operate a bearing scale centered around the display screen of the radar system and for providing stabilization of the radar display so that the radar presentation upon the display screen does not rotate along with rotation of the ship. The invention also includes a digital display of the ship's heading.

2. Description of the Prior Art.

Shipboard radar systems customarily include a gyro compass which produces incremental heading information to the radar system for rotation of a true bearing scale, providing north stabilization of the radar display, and for providing true motion correction. The most common gyro compass systems have either stepper motor or synchro-types of outputs. In the case of a stepper motor, three pole sets are commonly used with either 10' or 20° bearing steps per output pulse. Pulse amplitudes of 35, 50, or 70 volts are normally employed. Synchro outputs, which are ordinarily three-phased, produce analog outputs representing either 1° or 2° of bearing per 360° of shaft rotation. The rotor is driven from a supply frequency of either 50 or 60 Hz with commonly used voltages of 50, 60, 62, 115, 125, and 150 volts. The stator voltages are known to range between 20 and 90 volts with 20, 24, 57, 68, 82, and 90 volts being used in the most common commercially available units.

In the past practice, it has been customary for the gyro compass to drive the bearing scale and resolver for north stabilization separately through separate electronic circuits and mechanical linkages. It was also customary with past concepts to design new compass drive circuitry and mechanical components for each type of stepper motor or synchro output with the wide possibility of output voltages and operating conditions. This practice was, of course, expensive, time consuming, and made new installations expensive.

A further problem with prior compass drive systems was the arrangement provided for aligning the true bearing scale and/or the north stabilization resolver to the ship's heading. Since none of the gyro compasses commonly available provide a north stabilization or "homing" pulse, there was an ambiguity in the output of the gyro compass. Loss of synchronization due to rapid turning or loss of electrical power to the equipment had to be corrected by manual resetting. In past practice, a thumb wheel control was provided for correcting the resolver while a clutch and handle control was provided for correcting the position of the true bearing scale. Each of these controls had to be set separately.

SUMMARY OF THE INVENTION

Accordingly, it is an object of the present invention to provide a compass drive system which is adaptable for use with either a DC stepper motor or synchro-type gyro compass output with stator coils and output provided in either the start or delta connection.

Furthermore, it is an object of the invention to provide such an adaptive compass drive which is capable of operation over a wide range of rotor supply frequency, stator voltage, and rotor voltage for synchro-type gyro compass outputs.

Also, it is an object of the present invention to provide an adaptive compass drive capable of operating with DC stepper motors in which the output pulse can represent 10', 20', or any other amount of bearing step over a predetermined range of output voltages or with 1', 2', or other amounts of bearing change per 360° of shaft rotation.

Moreover, it is an object of the present invention to provide a radar system having means for easily changing simultaneously both the position of the true bearing scale and synchro resolver for alignment with the ship's heading.

These as well as other objects of the invention may be met by providing a radar system having means for providing directional information from a gyro compass producing either synchro or stepper output signals having means for converting signals from the gyro compass to signals having a predetermined amplitude and timing relationship, means for determining a first condition when the signals present a first direction of rotation and a second condition when the signals represent a second direction of rotation, and means for providing first and second pulse streams wherein each pulse in each stream represents a predetermined amount of rotation and wherein pulses in the first stream are produced upon the first condition and pulses of the second stream produced upon the second condition. The combination may further comprise counting means for producing an advancing count in response to pulses of the first pulse stream and a decreasing count in response to pulses of the second pulse stream. The signals having a predetermined amplitude and timing relationship preferably comprise a plurality of digital signals in which the signals are activated in a first ordered sequence upon the first condition and the second ordered sequence upon the second condition. The converting means comprises preferably means for electrically isolating the signals from the gyro compass from the electrical signals within the system which preferably comprises opto-electric isolation means in which light producing means produces light in response to the active state of electrical signals coupled from the gyro compass and a plurality of means for producing an electrical signal in response to light produced by the light producing means. In the case that a synchro-type gyro compass is used, means is provided for producing a timing reference signal from the signals from the gyro compass. The timing reference signal producing means preferably comprises means for determining a digital state transition of one or more of the signals having a predetermined amplitude and timing relationship and means for producing one or more pulses in response to the determination of the digital state transition. The condition determining means may comprise means for comparing the present value of the state of the signals having a predetermined amplitude and timing relationship with the immediately previous value of the state of the same signals. Further may be provided a stepper motor, a bearing scale which is rotatable by the stepper motor, and means for operating the stepper motor in response to the counting means. The stepper motor may comprise a plurality of stepper coils wherein the stepper motor is operated by means for activating each of the stepper coils in response to a predetermined count output state of the counting means.

The invention may also be practiced with a radar system which includes a radar transmitter, a radar receiver, a rotatable radar antenna, a radar display means, a gyro compass having either synchro or stepper type output signals, and compass driving means for operating the bearing scale which is positioned around the data display and for operating north stabilization means wherein the compass driving means is capable of operating from either the synchro or stepper outputs of the gyro compass. The radar system may further comprise a synchro resolver transmitter having a plurality of stator coils and at least one rotor coil with the rotor coil coupled to the radar antenna and rotated as the radar antenna rotates, a synchro resolver having a plurality of stator coils and a plurality of rotor coils wherein the stator coils of the synchro resolver are coupled to corresponding ones of the stator coils of the synchro transmitter. A stepper motor may be provided which is mechanically coupled to the rotor coils of the synchro resolver such that the rotor coils of the synchro resolver are differentially variable in position with respect to the stator coils and wherein the stepper motor is operated by electrical outputs of the compass driving means. The stepper motor may further be operatively coupled to the bearing scale. The compass driving means may further produce digital signals representative of a heading as determined by the gyro compass. Means may be provided for visually displaying that heading. The means for visually displaying the heading may comprise either digit displays or means for displaying the heading upon the radar data displaying means.

DESCRIPTION OF THE PREFERRED EMBODIMENT

Figure 9:
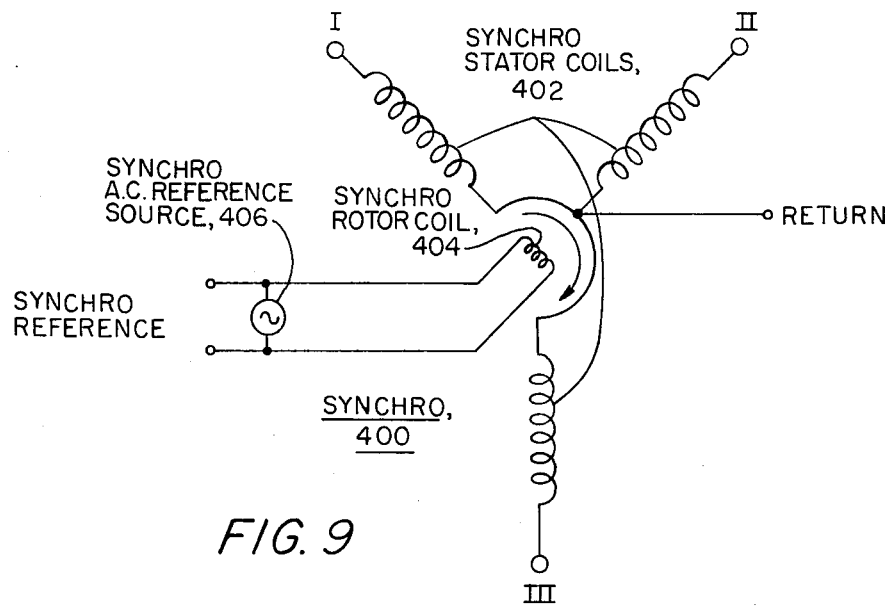
FIG. 9 is a schematic diagram of a synchro type gyro compass.
Figure 10:
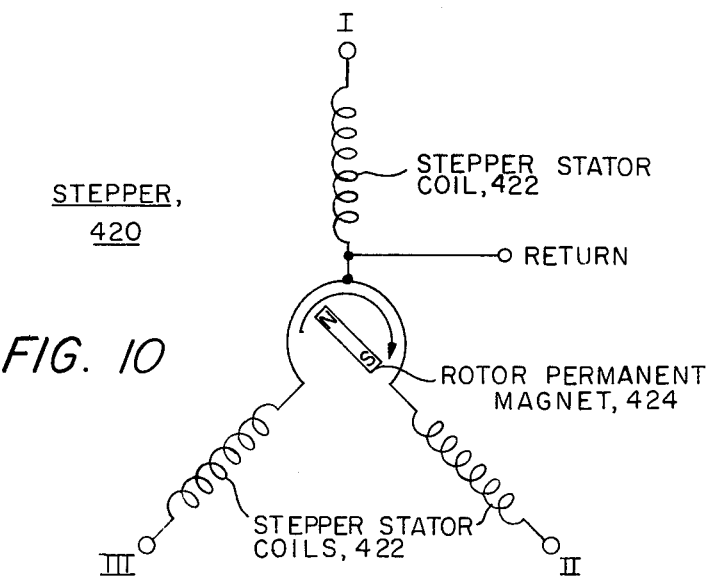
FIG. 10 is a schematic diagram of a stepper type gyro compass.

Referring briefly first to FIGS. 9 and 10, there is shown there respectively a synchro-type gyro compass 400 and a stepper type gyro compass 420. In the synchro-type gyro compass 400 shown in FIG. 9 there are provided three synchro stator coils 402 positioned electrically at 120° intervals around synchro rotor coil 404. In known commercially available synchro and stepper type gyro compasses iron cores are used for both stator and rotor coils. However, these are not shown in FIGS. 9 and 10 for clarity. Synchro rotor coil 404 is coupled to synchro AC reference source 406. Rotation of the ship and the gyro platform causes synchro rotor coil 404 to rotate within synchro stator coils 402 producing waveforms such as those shown in FIG. 5 as the ship rotates in heading. The synchro stator coils 402 as shown in FIG. 9 are connected in a star or Y-type connection with a return signal path. Synchro stator coils 402 may be connected in a delta configuration as well.

Figure 7:
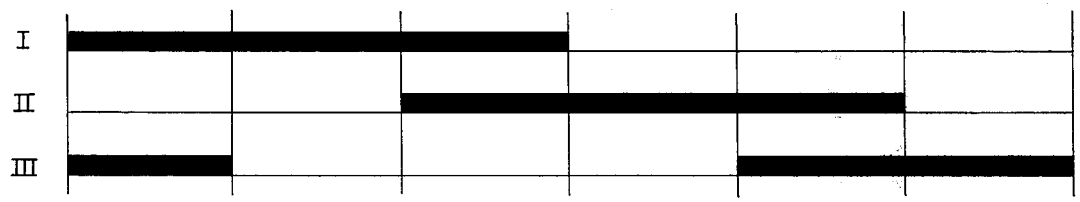

FIG. 10 shows schematically a gyro compass 420 with a stepper type output. The rotor of the gyro compass shown in FIG. 10 is formed by rotating permanent magnet 424 which rotates within stepper stator coils 422 as the ship rotates in heading. Rotation of rotating permanent magnet 424 causes the magnetic field from the permanent magnet to be coupled in sequence from one stepper stator coil 422 to the other producing output signals such as is shown in FIG. 7. Stepper stator coils 422 are shown in a star or Y-type connection as in FIG. 9, and as in the case of the device shown in FIG. 9 stepper stator coils 422 may be connected in a delta connection.

As stated above, the output voltages from any of the synchro stator coils 402 or stepper stator coils 422 may vary depending upon the number of turns used and the amount of coupling between the stator coils and rotor coil. The frequency of synchro AC reference source 406 is not the same among all commercially available units and a complete cycle of the output signals may represent varying amounts of heading change depending upon the exact construction of the commercial units involved.

Figure 1:
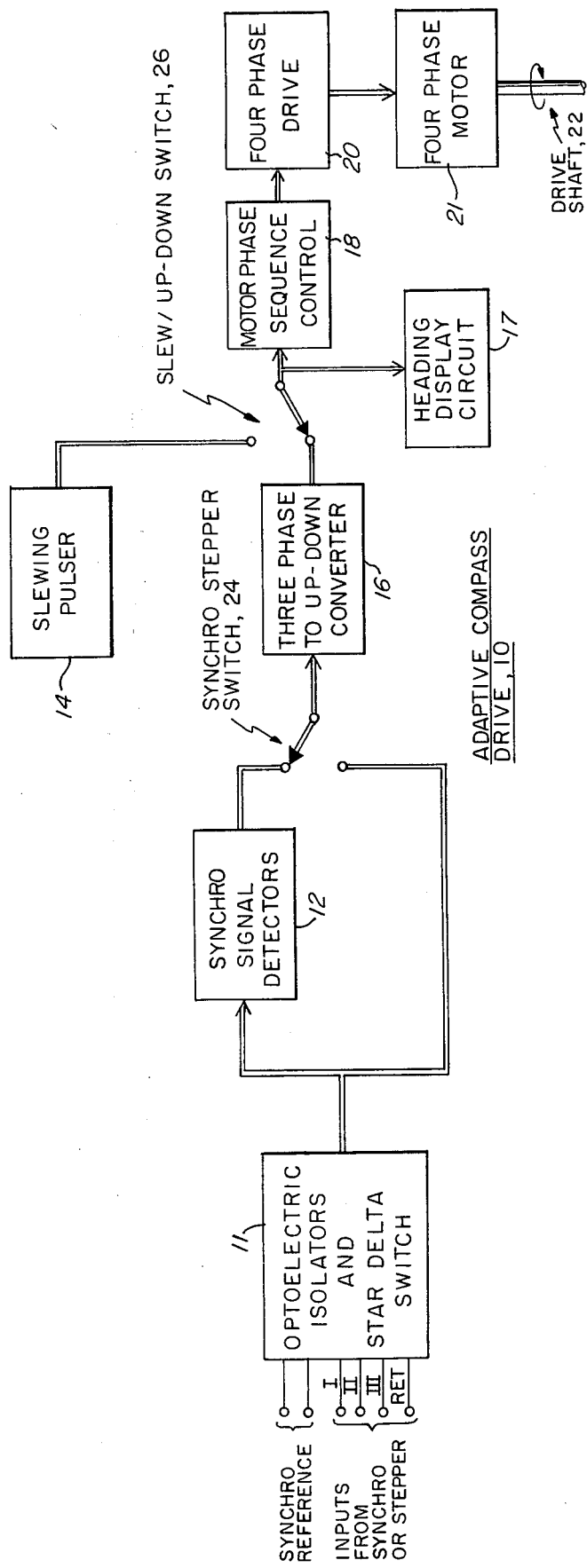
FIG. 1 shows a block schematic diagram of an adaptive compass drive system in accordance with the invention.

Referring now to FIG. 1 there is shown a block diagram of an adaptive compass drive system 10 constructed in accordance with the teachings of the present invention. Signals from the outputs of the gyro compass are coupled to opto-electric isolators and star/delta switch 11 to the appropriate terminals regardless of whether the gyro compass output is in the form of synchro or stepper signals, whether the output from the gyro compass is in the star or delta connection, or whether or not a synchro reference signal is provided. Opto-electric isolators and star/delta switch 11 provide opto-electric isolation between the outputs from the gyro compass and signals within adaptive compass drive 10 such that no direct electrical connection is made from outputs of the gyro compass and any electrical signals within adaptive compass drive 10. In this manner, high current ground surges which are common in many shipboard gyro compass systems are prevented from interfering with the operation of circuitry within adaptive compass drive 10.

Synchro/stepper switch 24 is used to select between synchro and stepper type gyro compass inputs. In the case that the gyro compass produces stepper type outputs, synchro/stepper switch 24 is placed in the downward position and the output signals from opto-electric isolators in star/delta switch 11 are coupled directly to three-phase to UP-DOWN converter 16. In the case of synchro gyro compass inputs, synchro/stepper switch 24 is placed in the upward position so that the output signals from opto-electric isolators in star/delta switch 11 are coupled through synchro signal detectors 12 before reaching the inputs of three-phase to UP-DOWN converter 16.

Figure 5:
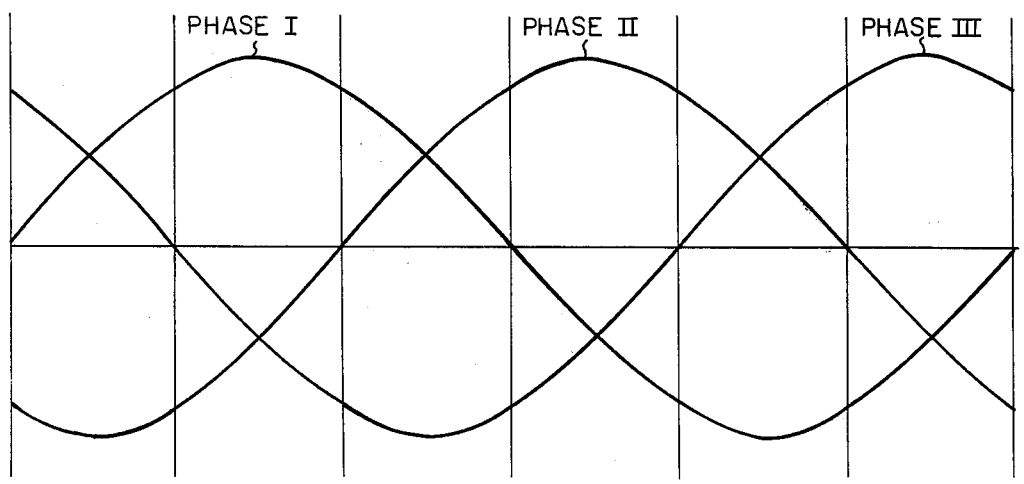
FIGS. 5, 6, 7, and 8 are waveforms useful in understanding the operation of the invention.
Figure 6:
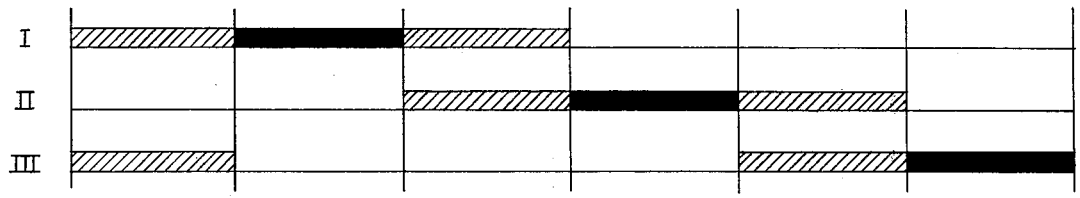

Opto-electric isolators and star/delta switch 11, in the case of inputs from a synchro gyro compass, converts the input signals such as shown in FIG. 5 to digital form having predetermined amplitude and phase characteristics such as that shown in FIG. 6. The fully darkened portion of the three signals shown in FIG. 6 indicates that the signal is in the active state while the crosshatched portion indicates an uncertainty in that the signal may or may not be in the active state.

Figure 8:
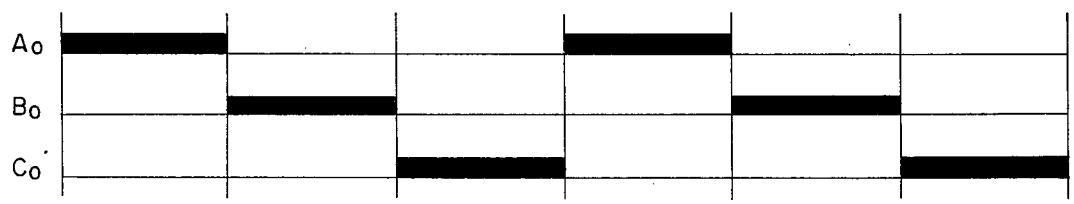

Three phase to UP-DOWN converter 16 first changes the incoming signals having the form shown in either FIG. 6 or FIG. 7 to the form shown in FIG. 8 with essentially no overlap in time of the activated state of the individual signals. The signals as shown in FIG.

8 represent rotation or heading change in a first direction with the signals being activated in the sequence $A_0$, $B_0$, $C_0$. In case of the opposite direction of rotation or change of heading, the signals shown in FIG. 8 are activated in the opposite order, that is, $C_0$, $B_0$, $A_0$. A determination is made within three phase to UP-DOWN converter 16 as to which condition or direction of rotation the signals upon the input represent. A first stream of pulses is produced, called the UP pulse stream, for rotation in the first direction while a second pulse stream, termed the DOWN pulse stream, is produced for rotation in the other direction. One pulse is produced in the appropriate pulse stream for transitions between activated signals.

In normal systems operation, slew/UP-DOWN switch 26 couples motor phase sequence control 18 to the outputs of three phase to UP-DOWN converter 16. Motor phase sequence control 18 activates four phase stepper motor 21 through four phase drive circuit 20. Four phase motor 21 has four stator coils which are activated one at a time in a first sequence for rotation in a first direction and one at a time in the opposite sequence for rotation in the opposite direction. Motor phase sequence control 18 through four phase drive circuit 20 causes activation of the four stator coils of four phase motor 21 in sequence in the first direction for UP pulses and in the opposite direction for DOWN pulses. Each incoming UP or DOWN pulse received from three phase to UP-DOWN converter 16 causes activation of the next four phase motor stator coils in sequence.

Slew/UP-DOWN switch 26 is provided to align the bearing scale and north heading of the radar display with the true heading of the ship should power fail or the present setting otherwise need be corrected. Slewing pulser 14 produces a continuous sequence of pulses for either the UP or DOWN direction regardless of whether the ship is changing heading. Slew/UP-DOWN switch 26 is coupled to slewing pulser 14 when an adjustment needs to be made, then Slew/UP-DOWN switch 26 is returned to the downward position to recouple motor phase sequence control 18 to three phase to UP-DOWN converter 16.

Also coupled to the outputs of slew/UP-DOWN switch 26 is heading display circuit 17. Heading display circuit 17 provides either a direct digit display of the ship's heading or provides a signal to the display device of the radar system to cause the heading to be displayed along with the radar data.

Figure 2:
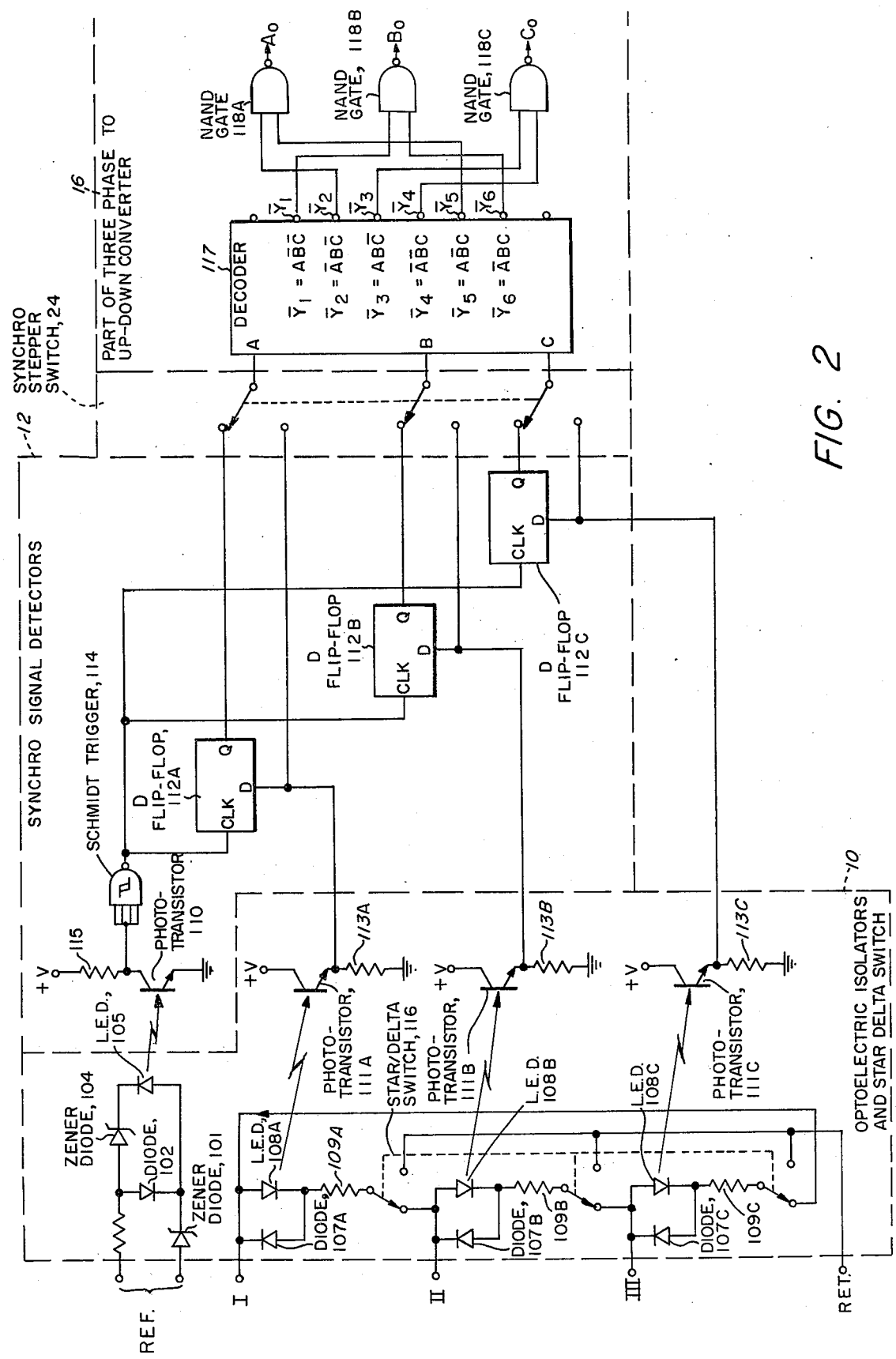
FIGS. 2, 3, and 4 taken together are a schematic diagram of the system showing FIG. 1.

Referring next to FIG. 2, there is shown therein schematic diagrams of opto-electric isolators and star/delta switch 10, synchro signal detectors 12, synchro/stepper switch 24, and a portion of three phase to UP-DOWN converter 16. Signals from the gyro compass stator windings are coupled to the terminals marked I, II and III regardless of whether the gyro compass employs the stepper or synchro mode of operation. In the case that the stator coils of the gyro compass are connected in a star configuration, the return terminal or center connection of the stator windings are coupled to the return lead. Star/delta switch 116, having three mechanically linked single pole, double throw sections, is placed in the position shown for the delta type connection. In that case, when terminal I is positive with respect to terminal II, current flows inward from terminal I through light emitting diode 108A and resistor 109A to terminal II. When the current level is sufficiently high, light emitting diode 108A emits light which is coupled to the input of phototransistor 111A. If terminal II is positive with respect to terminal I, current flows inward through terminal II, resistor 109A and to terminal I through diode 107A. Similarly, if terminal II is positive with respect to terminal III, current flows in from terminal II through light emitting diode 107B and resistor 109B to terminal III. Light is produced by light emitting diode 108B when the current reaches the same values that are required for activation of light emitting diode 108A. Activation of light emitting diode 108C coupled to terminal III is achieved in the same manner when terminal III is positive with respect to terminal I. The values of resistors 109A-C are determined such that light emitting diodes 108A-C produce light during overlapping portions of adjacent cycles of the input signals.

Star/delta switch 116 is placed in the position opposite that shown for the case of star connected inputs from the gyro compass. In that case, the various input signals are referenced to the return signal rather than to each other. The light emitting diodes are activated in sequence as before.

For the case of synchro-type inputs from the gyro compass, resistors 109A-C have a value chosen such that light emitting diodes 109A-C produce light during overlapping portions of adjacent cycles of the input signals so that light is produced during the activated intervals as shown in FIG. 6. In the case of stepper motor inputs, the value of resistors 109A-C should be chosen so as to produce light output during essentially the entire active time of the corresponding inputs. A single value may be used to perform satisfactorily for both synchro and stepper type input signals. The actual value chosen will be dependent upon the characteristics of the light emitting diode used.

The light produced by light emitting diodes 108A-C is coupled to a corresponding one of phototransistors 111A-C. The collector of each of phototransistors 111A-C is coupled to a positive voltage +V. The emitter of each is coupled through a resistor 113A-C to ground. The presence of light at an input of one of phototransistors 111A-C causes that phototransistor to conduct thereby causing current to flow through one of resistors 113A-C This current produces a positive voltage across the resistor which corresponds to a logical high state or "1" in accordance with the voltage requirements for logical "1" of the logic circuits to which the voltage is coupled. In the absence of light at the input of one of phototransistors 111A-C, the phototransistor conducts substantially no current such that no voltage is produced across one of resistors 113A-C. In that case, the voltage across the resistor is substantially zero representing a logical low or "0" state, again in accordance with the voltage requirements of the logic circuits to which the voltage is coupled.

In the case of a synchro type gyro compass, a reference signal will be furnished from the gyro compass to the adaptive compass drive circuitry. This signal is coupled to the reference terminals of opto-electric isolators and star/delta switch 10. When the upper most of the referenced terminals is positive with respect to the lower one of the terminals, current flows through resistor 100, diode 102, and zener diode 101. When the lower one of the terminals is positive with respect to the upper one of the terminals, current flows in through zener diode 101 through light emitting diode 105, and back to the upper one of the terminals through zener diode 104. The zener voltage of zener diodes 101 and 104 is chosen such that light emitting diode 105 produces light only during the time corresponding to the blackened portions of the signals as shown in FIG. 6 during which time it may be guaranteed that a signal is actively present. Zener diodes 101 and 104 are chosen to have approximately the same zener voltage to present a load of equal impedance to both positive and negative half cycles of the reference signal.

Light produced by light emitting diode 105 is coupled to the input of phototransistor 110. When light is present on the input of phototransistor 110, phototransistor 110 conducts and current flows through resistor 115 to phototransistor 110 and ground. A substantially zero voltage corresponding to a digital "0" is then present on the inputs of Schmidt trigger circuit 114. In the absence of light from light emitting diode 105 at the input of phototransistor 110, phototransistor 110 is in essentially a high impedance state and essentially no current flows through resistor 115 thereby producing a positive voltage of approximately $+V$ on the input to Schmidt trigger circuit 114. The transition from low to high and back to low voltages on the collector of phototransistor 110 causes Schmidt trigger 114 to produce a pulse on its output suitable for clocking "D" flip-flops 112A–C, the data inputs of which are coupled to the outputs from opto-electric isolators and star/delta switch 10.

Synchro/stepper switch 24 is shown in the upward position for receiving at the inputs of decoder 117 signals of the form shown in FIG. 6 from a synchro type gyro compass. In the downward position of synchro/stepper switch 24, stepper signals of the form shown in FIG. 7 are coupled to the inputs of decoder 117. Decoder circuit 117 and accompanying NAND gates 118A–C convert signals having the form shown in either FIG. 6 or FIG. 7 to the form shown in FIG. 8. This function is performed with the logic operations specified immediately herebelow in Table I.

TABLE I

| Output | Inputs |
|---|---|
| $A_0$ | $\overline{A}B\overline{C} + AB\overline{C}$ |
| $B_0$ | $A\overline{B}\overline{C} + \overline{A}BC$ |
| $C_0$ | $AB\overline{C} + \overline{A}\overline{B}C$ |

For example, assume that the input signals are as shown in the first segment of FIG. 7; that is, as seen in FIG. 2, inputs I and III are high and II is low. This will cause the outputs of phototransistors 111A and 111C to be high and 111B to be low. That is, the inputs to the decoder 117 are $A\overline{B}C$. This condition is decoded as $Y_5$, only, low. It should be noted that the decoder 117 can only have one output low at a time. NAND gate 118A has one input low and one high, therefore its output $A_0$ will be high. NAND gates 118B and 118C both have both inputs high, therefore $B_0$ and $C_0$ are low; this corresponds to segment I of FIG. 8. Using similar arguments for the second segment of FIG. 7 in which only input I is high, the input to the decoder 117 is $A\overline{B}\overline{C}$ and $Y_1$, only, is low. Only NAND gate 118B has one low input signal and consequently only $B_0$ output is high; this corresponds to segment 2 of FIG. 8. Similar arguments can be used for all the segments, and a segment-by-segment conversion from the conditions of FIG. 7 to the conditions of FIG. 8 is obtained. Similar arguments can be used from FIG. 6 to FIG. 8.

Figure 3:
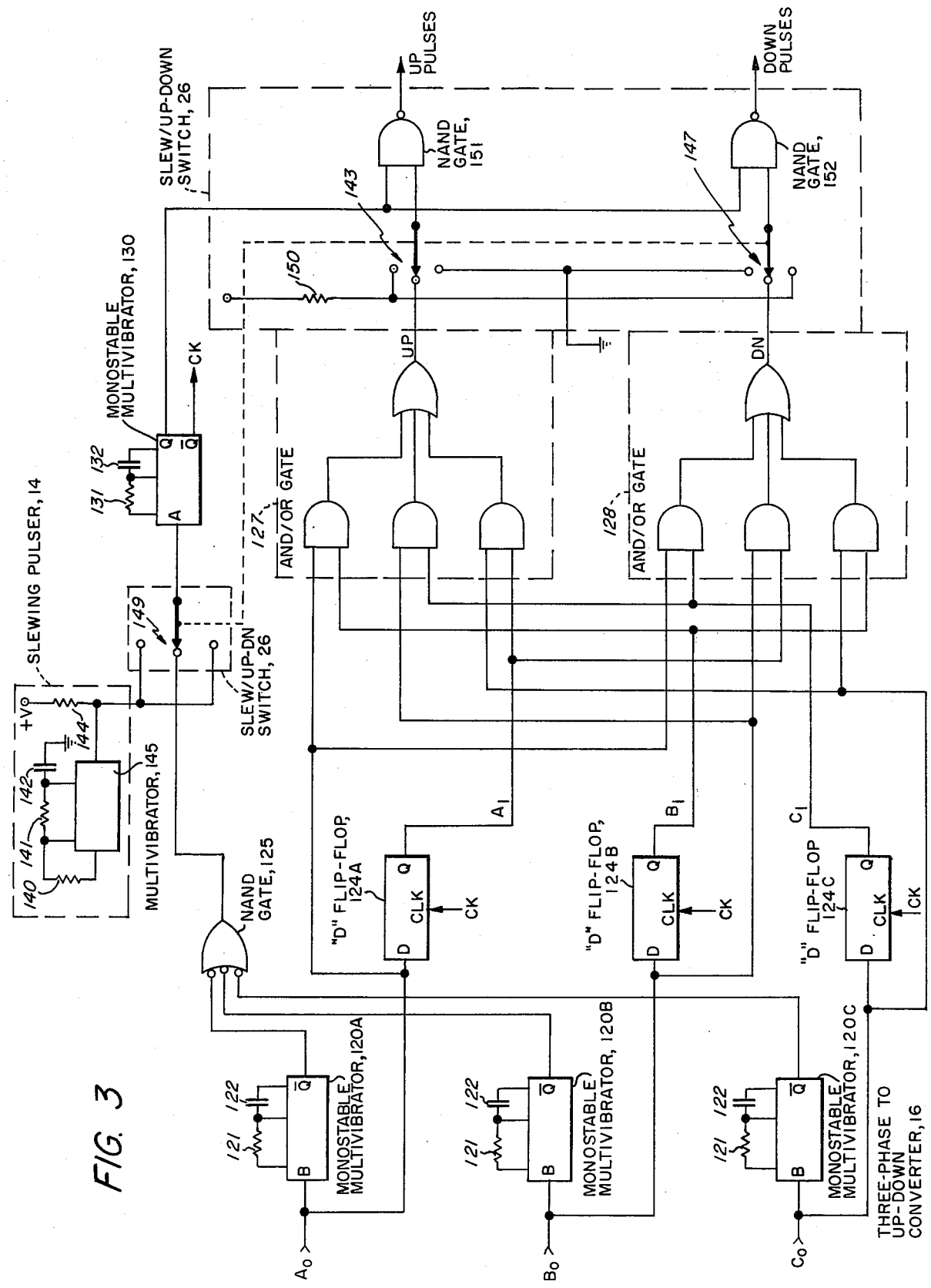

The major portion of three-phase to UP-DOWN converter 16 which converts the digitized inputs from synchro signal detectors 12 to trains of pulses is shown in FIG. 3. A train of UP pulses are produced for rotation in the first direction representing rotational movement of the ship towards higher bearing angles while a second or DOWN train of pulses is produced for rotation of the ship in the second direction or direction of decreasing bearing heading. The non-overlapping three-phase input signals $A_0$, $B_0$, and $C_0$ from NAND gates 118A–C are coupled to the respective inputs of three monostable multivibrators 120A–C and also transitions between low and high logic levels, that is from "0" to "1" on any of the input signals causes the corresponding one of monostable multivibrators 120A–C to produce a pulse of width determined by the respective values of timing resistors 121 and timing capacitors 122. In the preferred embodiment, monostable multivibrators 120A–C, as well as monostable multivibrator 120, may be Texas Instruments Company type SN74123 type multivibrator in which resistors 121 have a value of 50K ohms and capacitors 122 have a value of 470 pf such that an output pulse is produced having a width of approximately 10 $\mu$sec. for each high going input transition. The output pulses from each monostable multivibrator 120A–C are "OR'd" together to produce a single serial stream of pulses upon the output of NAND gate 125. A positive or high going pulse having a width of approximately 10 $\mu$sec. is produced on the output of NAND gate 125 for each high going transition of any of signals $A_0$, $B_0$, or $C_0$. With slew/UP-DOWN switch 26 set in the center position as shown in the drawing the output from NAND gate 125 is coupled through section 149 of slew/UP-DOWN switch 26 to the input of monostable multivibrator 130. The input to multivibrator 130 from switch section 149 carrying the train of pulses originally generated by monostable multivibrators 120A–C is connected such that the trailing edge of each pulse in the pulse stream carried thereon causes generation of a second pulse on the outputs of monostable multivibrator 130 in the time period immediately following the first. The width of pulses generated by monostable multivibrator 130 may be the same as those produced by monostable multivibrators 120A–C. The same values of timing resistor and timing capacitor may be used as with multivibrators 120A–C. The $\overline{Q}$ or low going output of monostable multivibrator 130 is coupled to the clock inputs of each of "D" flip-flops 124A–C. These pulses clock in the inputs to "D" flip-flops 124A–C at a time period following the initial edge transitions thereof at which time it is assured that the signals are in a stable state.

The outputs from "D" flip-flops 124A–C, herein called $A_1$, $B_1$, and $C_1$, representing the values of the three-phase input signals in a previous time period, are compared with the present values of the three-phase signals $A_0$, $B_0$, and $C_0$ to determine whether a change in the activated one of the three-phase signals represents rotation in a positive or negative sense. The sequence of signals which represents clockwise or positive rotation is shown in Table II while the sequence for counter-clockwise or negative rotation is shown in Table III where "1" represents the active or high state and "0" represents the inactive or low state.

TABLE II

| Present State | Previous State |
|---|---|
| $A_0 B_0 C_0$ | $A_1 B_1 C_1$ |

TABLE II-continued

| Present State | Previous State |
|---|---|
| 1 0 0 | 0 0 1 |
| 0 1 0 | 1 0 0 |
| 0 0 1 | 0 1 0 |
| 1 0 0 | 0 0 1 |
| . | . |
| . | . |
| . | . |

TABLE III

| Present State | Previous State |
|---|---|
| $A_0B_0C_0$ | $A_1B_1C_1$ |
| 0 0 1 | 1 0 0 |
| 0 1 0 | 0 0 1 |
| 1 0 0 | 0 1 0 |
| 0 0 1 | 1 0 0 |
| . | . |
| . | . |
| . | . |

The logic equation indicating clockwise or positive rotation indicative of the requirement for producing UP pulses may then be written by "AND"ing adjacent entries in Table II then "OR"ing the resultant products together. Similarly, the equations representing negative or counterclockwise rotation indicative of DOWN pulses may be produced by "AND"ing together adjacent values within Table III and "OR"ing the resultant products together. The resulting equations may be simplified to:

$$UP = A_0C_1 + B_0A_1 + C_0B_1$$

$$DOWN = A_0B_1 + B_0C_1 + C_0A_1$$

AND/OR gates 127 and 128 perform the required decoding function. The output of AND/OR gate 127 is in the logical "1" state for positive rotation while the output of AND/OR gate 128 is in the logical "1" state for downward or negative rotation. With slew/UP-DOWN switch 26 set in the center or active position as is shown in FIG. 3, the outputs from AND/OR gates 127 and 128 activate a corresponding input of corresponding NAND gates 151 and 152. The same pulse train clocking signal produced by multivibrator 130 as was coupled to the clocking inputs of flip-flops 124 but of the opposite high-going logic state is coupled to the other input of each of NAND gates 151 and 152. When the output of AND/OR gate 127 is in the logical "1" state, pulses from multivibrator 130 are coupled through NAND gate 151 to produce the UP train of pulses. During that time NAND gates 152 is deactivated with logical "0" state from AND/OR gate 128. When the output of AND/OR gate 128 is in the logical "1" state and the output of AND/OR gate 127 is in the logical "0" state, pulses from multivibrator 120 are coupled through NAND gate 152 to form pulses of the DOWN pulse train on the output of NAND gate 152.

Figure 4:
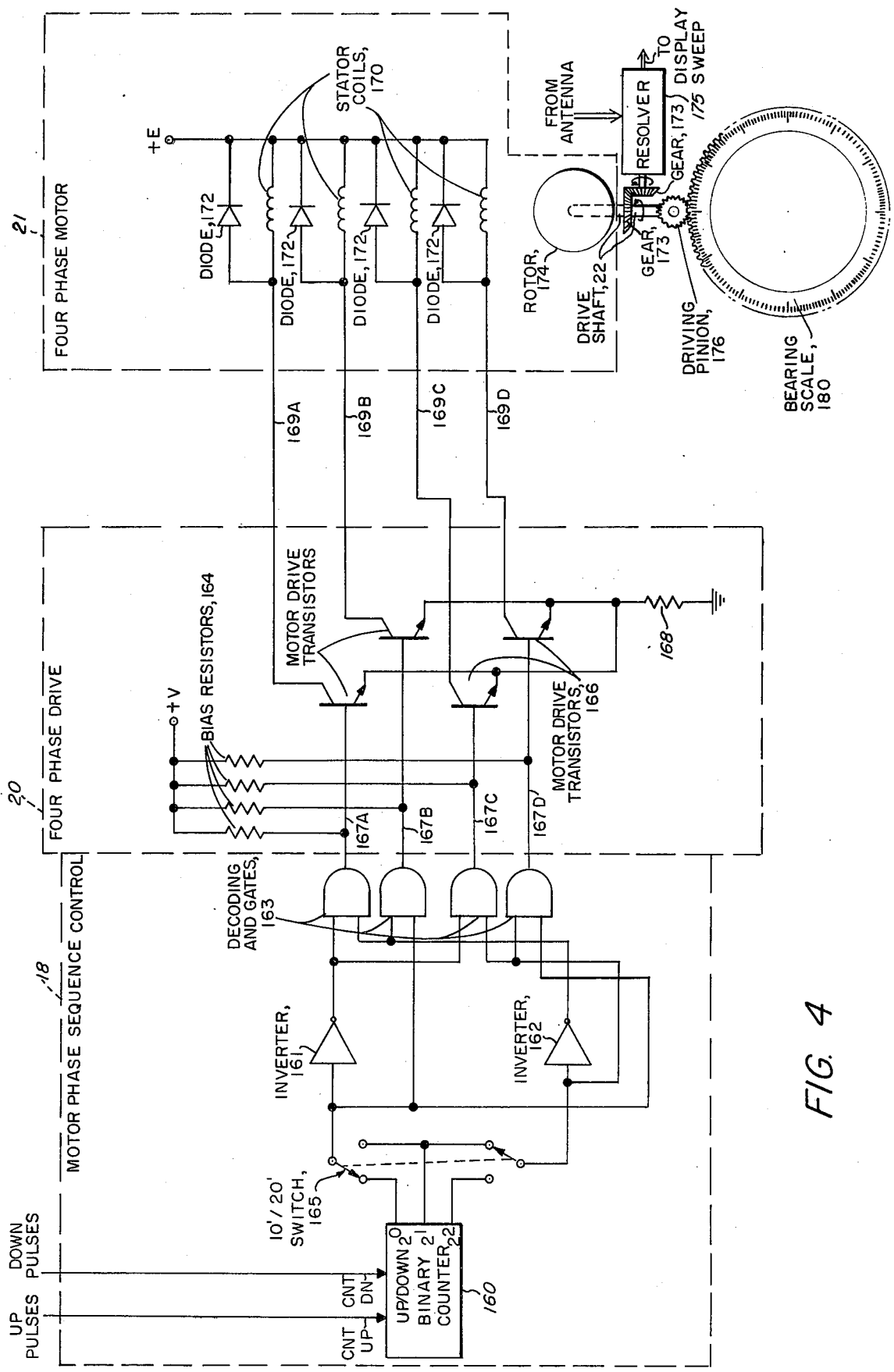

Referring next to FIG. 4, there is shown therein the schematic diagram of motor phase sequence control 18, four phase drive circuit 20, and four-phase motor 21. The UP and DOWN pulse trains are coupled to the corresponding count UP and count DOWN inputs of UP/DOWN binary counter 160. UP/DOWN binary counter 160 may comprise a Texas Instruments Company integrated circuit type SN74193. Each pulse on the count UP input causes UP/DOWN binary counter 160 to advance by one binary count while a pulse on the count DOWN input causes the count to decrement by one count. In the count UP direction, UP/DOWN binary counter 160 counts from 000 to 111 in increments of 001 then resets to 000. In the DOWN direction, UP/DOWN binary counter 160 counts down from 111 to 000 by steps of 001 then is reset to 111.

Because of the arrangement of coils within the gyro compass, the difference between single steps of the binary count output of UP/DOWN binary counter 160 can represent a change of either 10' or 20'. For the former case, 10'/20' switch 165 is set to the position shown so that every UP or DOWN pulse produces activation of four phase motor 21. For the latter case, the position of 10'/20' switch 165 is changed to the other position so that only every other UP or DOWN pulse activates four phase motor 21.

Inverters 161 and 162 and decoding NAND gates 163 decode the binary count produced by UP/DOWN binary counter 160 thereby activating lines 167A–C in the sequence 167A-167B-167C-167D-167A-... for an increasing or UP count and in the sequence 167D-167C-167B-167A-167D-... for a decreasing or DOWN count.

Motor drive transistors 166 are activated in sequence by the activated outputs of decoding AND gates 163. The emitters of all motor drive transistors 166 are connected together then to ground through resistor 168. The collectors of each of motor drive transistors 166 are coupled to one of stator coils 170 with the other terminals of stator coils 170 coupled together and coupled to a positive voltage of +E. When one of motor drive transistors 166 is turned on by the activated signal at its input, current flows through the corresponding one of stator coils 170 through the one or more motor drive transistors 166 and to which it is employed through resistor 168. Diodes 172 are coupled one across each stator coil 170 to prevent high voltage build-up across the stator coils when an activated coil is deactivated by providing a current conduction path in the reverse direction. Activation of stator coils 170 in a first sequence as caused by UP pulses causes rotation of rotor 174 in a first direction while activation of stator coils 170 in the opposite sequence as caused by DOWN pulses causes rotation of rotor 174 in the opposite direction.

Drive shaft 22 coupled to rotor 174 of four phase motor 21 is coupled mechanically to both bearing scale 180 and resolver 175. Bevel gears 173 couple drive shaft 22 to the rotatable shaft of resolver 175 while driving pinion gear 176 links drive shaft 22 to bearing scale 180. The number of teeth on driving pinion 176 relative to the number of teeth on the periphery of bearing scale 180 are chosen such that bearing scale 180 is rotated by the appropriate angle corresponding to the amount of rotational change indicated by the output signals from the gyro compass.

In previous gyro compass systems, means was provided for mechanically rotating the bearing scale by hand to align the bearing scale with the true heading of the ship. Means is provided within the system of the present invention for aligning bearing scale 180 with the true heading of the ship simply by setting a switch in one position for clockwise rotation and in another position for counter clockwise rotation until the desired alignment is reached. Referring back to FIG. 3, slewing pulser 14 produces a continuous pulse output at a frequency which is determinative of the rate at which bearing scale 180 rotates while seeking alignment. The output of slewing pulser 14 is coupled to both upper and lower positions of section 149 of slew/UP-DOWN switch 26. When slew/UP-DOWN switch 26 is set in the upper position, a logical "1" or positive voltage input is coupled to the lower input of NAND gate 151 and a logical "0" or ground state coupled to the lower input of NAND gate 152. The continuous stream of pulses produced by slewing pulser 14 is coupled by section 149 to the upper input of NAND gate 151 thereby producing a continuous train of UP pulses independent of any rotation of the ship or inputs from the ship's gyro compass. Similarly, when slew/UP-DOWN switch 26 is set to the lower position, a logical "0" is coupled to the lower input of NAND gate 151 and a logical "1" coupled to the lower input of NAND gate 152 thereby disabling NAND gate 151 and enabling NAND gate 152 to produce a continuous train of DOWN pulses. Slew/UP-DOWN switch 26 is left in either the UP or DOWN position until the desired alignment of bearing scale 180 is achieved then returned to the center position as shown for active system operation. Preferably, slew/UP-DOWN switch 26 comprises a toggle switch having a stable center position with spring returns for both the UP and DOWN positions.

Figure 11:
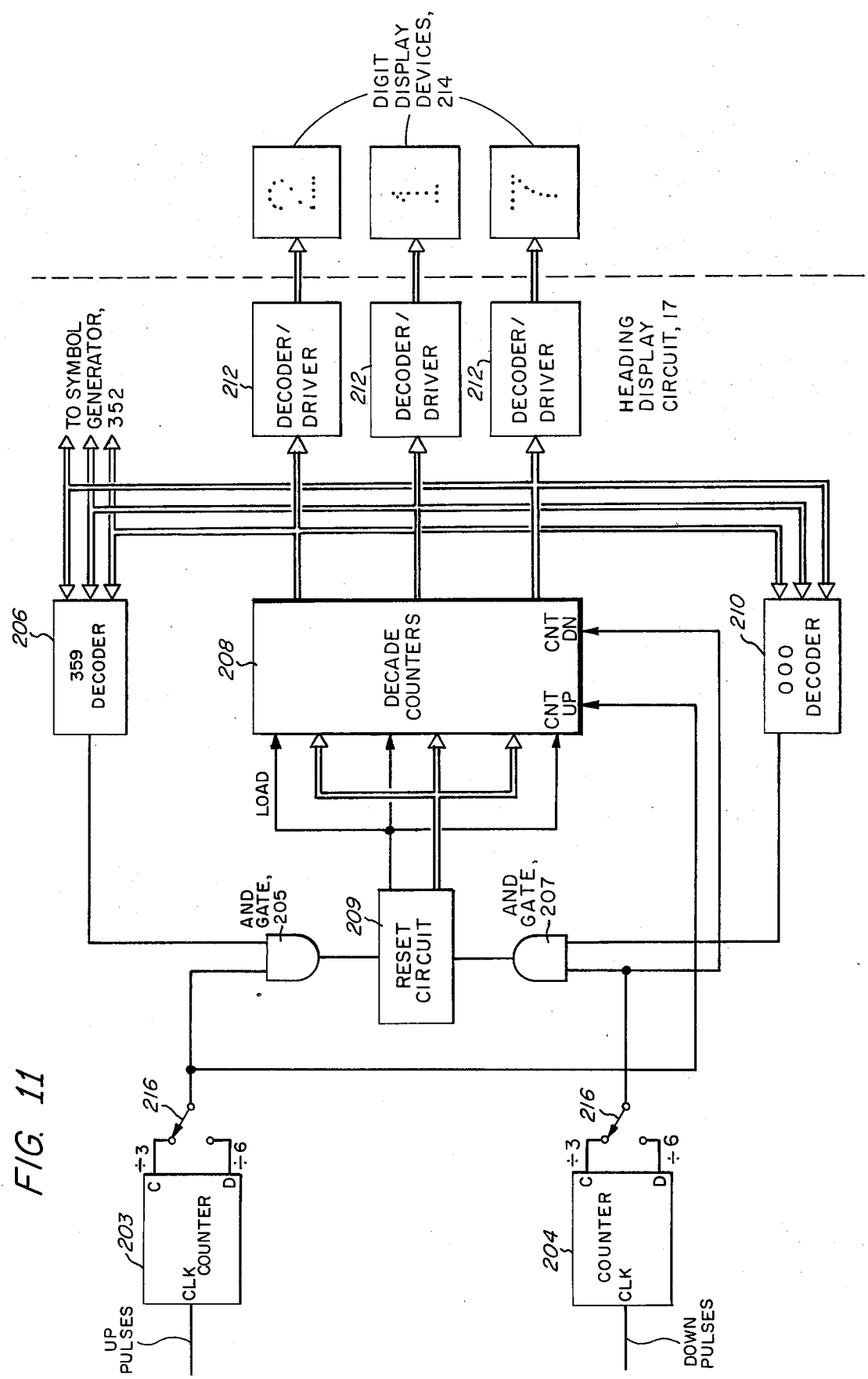
FIG. 11 is a schematic diagram of a heading display circuit for use with the invention.

A direct digitally presented display of the ship's heading is provided by heading display circuit 17 and digital display devices 214 as shown in FIG. 11. The UP pulses from NAND gate 151 are coupled to the count input of counter 203 while the DOWN pulses from NAND gate 152 are coupled to the count input of counter 204. Counters 203 and 204 each provide two outputs, one producing an output pulse or square wave for every three counts of the corresponding input count and the other for six pulses of the clock input. Thus, the selected output produces a pulse or square wave cycle for every one degree of ship's heading rotation. The selected output from counter 203 is coupled to the UP count input of decade counters 208 while the selected output from counter 204 is coupled to the count DOWN input of decade counters 208. Decade counters 208 produce three sets of output digital signals, the first set corresponding to units, the second to tens, and the third to hundreds. Decade counters 208 increment or decrement once for each count input applied.

The three sets of output signals from decade counters 208 are decoded by decoder/drivers 212 which convert the output signals from decade counters 208 to a form appropriate for driving digit display devices 214. Digit display devices 214 may be light emitting diodes, gaseous display tube devices, or any other desired form of digital display device. Also, the output of decade counters 208 may be used with a character or numeric symbol generated device for causing a digital display of the ship's heading directly onto the tube of the cathode ray tube displaying the radar return information.

"359" decoder 206 and "000" decoder 210 convert decade counters 208 from a modulo 1000 counter to a modulo 360 counter. When the output lines from decade counters 208 reach a count of 359, "359" decoder 206 produces a logical "1" on its output enabling AND gate 205. The next upward counting pulse then is enabled through AND gate 205 to reset circuit 209 which causes 000 to be loaded into decade counters 208 with a load pulse coupled to each decade of decade counters 208. Similarly, when the outputs of decade counters 208 are in the 000 state, "000" decoder 210 enables AND gate 207 causing the next count pulse from counter 204 to reset circuit 209 which causes a value of 359 to be loaded into decade counters 208.

Figure 12:
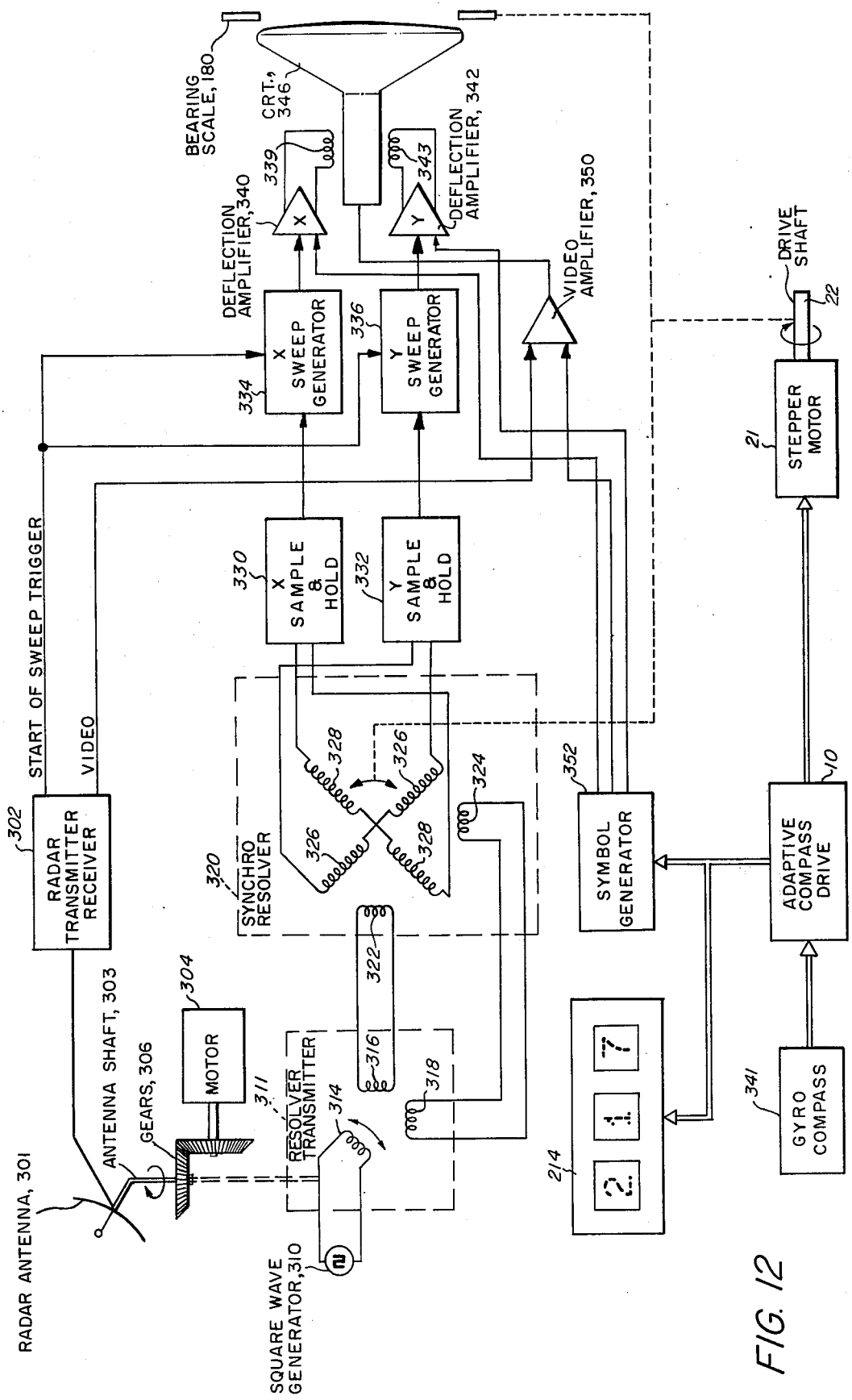
FIG. 12 is a block diagram of a radar system embodying the invention.

Referring next to FIG. 12, there is shown a block schematic diagram of a radar system in which the present invention is used to advantage. Radar antenna 301 is rotatably coupled to radar antenna shaft 303. Bevel type gears 306 couple rotational power from motor 304 to radar antenna shaft 303.

Rotor coil 314 of resolver transmitter 311 is also coupled to radar antenna shaft 303. Rotor coil 314 rotates within stator coils 316 and 318 which are electrically positioned 90° from one another such that when rotor coil 314 is positioned at the point of maximum coupling with one of stator coils 316 or 318 the coupling between rotor coil 314 and the other one of stator coils 316 or 318 is a minimum. The coupling between rotor coil 314 and stator coils 316 and 318 is preferably sinusoidal for a constant rate of radar antenna rotation. Square wave generator 310 is electrically coupled to stator coil 314 causing a square wave current to flow therethrough. The resultant voltages induced in stator coils 316 and 318 are square wave in form even with a sinusoidal modulation envelope having a 90° phase difference between the two envelopes.

Stator coils 316 and 318 of resolver transmitter 311 are coupled to stator coils 322 and 324 respectively of synchro resolver 320. Synchro resolver 320 has two sets of rotor coils 326 and 328 positioned electrically at a right angle with each other and rotatably mounted within stator coils 322 and 324. The rotational position of rotor coils 326 and 328 within stator coils 322 and 324 determines the amount of coupling between each rotor coil 326 and 328 and stator coils 322 and 324. Hence, the phase of the modulation envelope of the voltage induced in each of rotor coils 326 and 328 is directly dependent upon their rotational position. As the rotational position of the radar return signal patterns displayed on cathode ray tube 346 is dependent upon the phase relationship between the output signals from rotor coils 326 and 328, the displayed patterns can be rotated by rotation of rotor coils 326 and 328. This is accomplished by mechanically coupling rotor coils 326 and 328 to drive shaft 22 of stepper motor 21. In this manner, rotation of drive shaft 22 as the ship changes heading in accordance with the invention causes rotation of rotor coils 326 and 328 thereby causing the pattern displayed upon cathode ray tube 346 to remain stable, preferably with the top of the pattern being north, independent of the heading of the ship. Of course, rotor coils 326 and 328 may be uncoupled from drive shaft 22 and set in a constant rotational position so that the displayed pattern rotates with changes in ship's heading.

Rotor coils 326 and 328 are coupled respectively to X and Y sample and hold circuits 330 and 332. X and Y sample and hold circuits 330 and 332 sample the output voltages from rotor coils 326 and 328 during each active pulse time and retain the sampled values on their respective outputs until the next sample is taken.

X and Y sweep generators 334 and 336 produce X and Y ramp shaped deflection signals for deflecting the beam of cathode ray tube 346. The amplitude of each is directly dependent upon the amplitude of the signal present on the output of the respective sample and hold circuit and with the same polarity. Generation of the deflection signals commences near the time each radar pulse is transmitted as marked by a start of sweep trigger pulse produced by radar transmitter/receiver 302. After amplification to appropriate levels by X and Y deflection amplifiers 340 and 342, the deflection signals are coupled to X and Y deflection coils 339 and 343 which produce magnetic fields for deflecting the beam of cathode ray tube 346.

Received and demodulated radar return video signals from radar transmitter/receiver 302 are coupled to video amplifier 350 which amplifies the video signals to a level appropriate for driving the video intensity modulating electrode of cathode ray tube 346.

Symbol generator 352, which may be constructed using techniques well-known in the display system art, receives a digital input number from adaptive compass drive 10 as shown in FIG. 12 and produces X and Y deflection waveforms and a video signal which cause the beam of cathode ray tube 346 to be deflected and unblanked in such a manner as to display the digits representing the ship's heading upon the face of cathode ray tube 346.

This concludes the description of the preferred embodiments of the invention. Although preferred embodiments of the invention have been described, it is believed that numerous modifications and alterations thereto would be apparent to one having ordinary skill in the art without departing from the spirit and scope of the invention.

What is claimed is:

1. An adaptive compass drive system capable of operation over a wide variety of compass outputs and supply voltages and frequencies by provision of combination signals which employs a digital phase detector to convert gyro compass outputs in the form of multiphase analog signals to a stream of up-down pulses for activation of a multiphase stepper motor and a converter to which the compass output when in the form of overlapping digital signals is converted to said stream of up-down pulses for actuation of said stepper motor coupled to a bearing indicator which includes the method for providing direction information from the gyro compass by producing a combination signal from a single selection of synchro and stepper signals comprising the steps of:
    converting said signals from said gyro compass to said combination signals having a predetermined amplitude and timing relationship;
    coupling said combination signals to a decoder circuit and converting multi-phasic input signals having overlapping active states to multi-phasic signals in which only a single phase of said signals is activated at one time;
    determining a first condition when said multi-phasic signals represent a first direction of of rotation and a second condition when said multi-phasic signals represent a second direction of rotation; and
    providing first and second pulse streams, each pulse in each of said pulse streams representing a predetermined amount of rotation, pulses of said first stream being produced upon said first condition and pulses of said second stream being produced upon said second condition.

2. The method of claim 1 further comprising the step of:
    producing an advancing count in response to pulses of said first pulse stream and a decreasing count in response to pulses of said second pulse stream.

3. The method of claim 2 further comprising the step of:
    activating said signals having a predetermined amplitude and timing relationship in a first ordered sequence upon said first condition and in a second ordered sequence upon said second condition.

4. The method of claim 3 further comprising the step of:
    electrically isolating said signals from said gyro compass from signals within said system.

5. The method of claim 4 wherein said gyro compass is a synchro type gyro compass and further comprising the step of:
    producing a timing reference signal from said signals from said gyro compass.

6. The method of claim 5 wherein said step of producing said timing reference signal comprises:
    determining a digital state transition of one or more of said signals having a predetermined amplitude and timing relationship; and
    producing one or more pulses in response to said digital state transition.

7. The method of claim 3 wherein said step of determining said condition means comprises:
    comparing a present value of the state of said signals having a predetermined amplitude and timing relationship with the immediately previous value of the state of said signals having a predetermined amplitude and timing relationship.

8. An adaptive compass drive for operation with a gyro compass adapted to operate over a plurality of supply voltages and frequencies from a single selection from a synchro output and a stepper type output for driving a bearing scale for providing north stabilization for a radar display including a digital readout of ship's heading comprising in combination:
    opto-electric isolation means for receiving signals from said gyro compass, producing light in response to each of said signals from said gyro compass, and for producing output signals electrically isolated from said signals from said gyro compass, said output signals having a predetermined amplitude;
    a plurality of switch means coupled to said opto-electric isolation means for configuring said opto-electric isolation means for receiving signals from said gyro compass having star or delta connection;
    means for producing a timing reference signal for signals from a gyro compass having a synchro configuration, said timing reference signal producing means comprising opto-electric isolation means and a Schmidt trigger;
    a first plurality of flip-flops, one of said first plurality of flip-flops being provided for each outputs from said optoelectric isolation means, and the clock inputs of said first plurality of flip-flops being coupled to the output of said Schmidt trigger;
    a plurality of switch means for selecting between synchro and stepper types of gyro compass output, one input of each of said switch means being coupled to an output of one of said flip-flops and another input of said switch means being coupled to an output of said opto-electric isolation means;
    a first decoder circuit coupled to outputs of said switch means, said first decoder converting multi-phasic input signals having overlapping active states to multi-phasic signals in which only a single phase of said signals is activated at one time;
    a second plurality of flip-flops, one of said second plurality of flip-flops being coupled to each output of said digital decoder means;

means for producing a first pulse in response to a transition from an inactive state to an active state of one or more of said output signals from said digital decoder means;

means or producing a second pulse upon the termination of said first pulse, said second plurality of flip-flops each being clocked by said second pulse;

second and third decoder circuits, inputs of said second and third decoder circuits being coupled to inputs and outputs of ones of said second plurality of flip-flops, said second decoder circuit producing an output in response to signals representing rotation in the first direction and said third decoder producing an output in response to signals representing rotation in the second direction, each of said second plurality of flip-flops being clocked by said pulse;

a second decoder circuit coupled to inputs and outputs of said second plurality of flip-flops, said second decoder circuit producing a first digital output in response to signals from said gyro compass representing a first direction of rotation and said second decoder circuit producing a second digital signal in response to signals from said gyro compass representing rotation in a second direction;

means for producing a first sequence of pulses in response to said output of said second decoder and means for producing a second sequence of pulses in response to said second output of said second decoder;

a binary counter, said binary counter producing an advancing count in response to said first sequence of pulses and said binary counter producing a decreasing count in response to said second sequence of pulses;

means for producing a plurality of activating signal in response to preselected ones of the output count of said counter;

a plurality of amplifying means, one of said amplifying means being provided for amplifying each of said activating signals; and a stepper motor, said stepper motor having a plurality of stator coils, each of said stator coils being coupled to one of said amplifying means.

9. The combination of claim 8 wherein said opto-electric isolation means comprise:
a plurality of light emitting diodes; and
a plurality of phototransistors, each of said phototransistors being positioned to receive light from one of said light emitting diodes.

10. The combination of claim 8 wherein said means for producing said first and second pulses comprise: monostable multivibrator means.

11. The combination of claim 8 wherein said means for producing said first and second sequence of pulses comprises:
means for producing a continuous sequence of pulses; and
means for gating said continuous sequence of pulses on and off.

12. The combination of claim 8 wherein said amplifying means each comprise:
a transistor amplifier.

13. The combination of claim 8 further comprising:
means for providing a visual display in response to outputs of said binary counter.

* * * * *